United States Patent [19]
Blair et al.

[11] 3,802,390
[45] Apr. 9, 1974

[54] SYSTEM FOR FEEDING AND MAINTAINING ANIMALS IN A CONFINED ENVIRONMENT

[75] Inventors: Bruce A. Blair, Winnetka; Roger H. Stevens, Streator, both of Ill.

[73] Assignee: International Farm Systems, Inc., Streator, Ill.

[22] Filed: Jan. 10, 1972

[21] Appl. No.: 216,382

Related U.S. Application Data

[63] Continuation-in-part of Ser. No. 879,194, Nov. 24, 1969.

[52] U.S. Cl. .................................................. 119/16
[51] Int. Cl. ............................................ A01k 01/00
[58] Field of Search ................ 119/16, 20, 28, 51 R

[56] References Cited
UNITED STATES PATENTS

| | | | |
|---|---|---|---|
| 3,223,070 | 12/1965 | Gribble et al. | 119/16 |
| 3,530,831 | 9/1970 | Conover | 119/16 |
| 3,191,577 | 6/1965 | McMurray | 119/16 |
| 3,148,662 | 9/1964 | Morrell | 119/16 X |
| 2,929,356 | 3/1960 | Bacigalupo | 119/51 R |

*Primary Examiner*—Hugh R. Chamblee
*Attorney, Agent, or Firm*—Curtis, Morris & Safford

[57] ABSTRACT

A system for maintaining and feeding animals in a confined environment wherein a structure is provided having a plurality of tiers with each tier being partitioned into a plurality of animal confinement pens. The floors of each pen are of an open grill work to allow a controlled flow of ambient ventilation air to flow upwardly from the floor of the structure through the pens on the lowermost tiers and into the pens in the tiers above. A portion of each pen is provided for the animals to eliminate waste and the waste is collected beneath the bottom tier. The collected animal waste is removed by a recycling flushing system into a collecting vat and returned to a processing apparatus where it is processed by promoting a culture action to convert the animal waste into a useable protein supplement which is added to the animal's food supply. The supply, i.e., a slurry mixture of bean and/or corn meal and the protein supplement derived from the reprocessed animal waste is pumped by a central distributing pump and distributed into troughs available to each of the animal confinement pens for feeding. In addition, a dome-shaped covering is provided over the tiered structure including a ventilation system which automatically maintains proper temperature and humidity levels within the enclosure at all times and provides for proper air flow within the enclosure so that each pen on each tier is properly ventilated at all times.

28 Claims, 13 Drawing Figures

TIERS 34, 36, 38

TIERS 40, 42

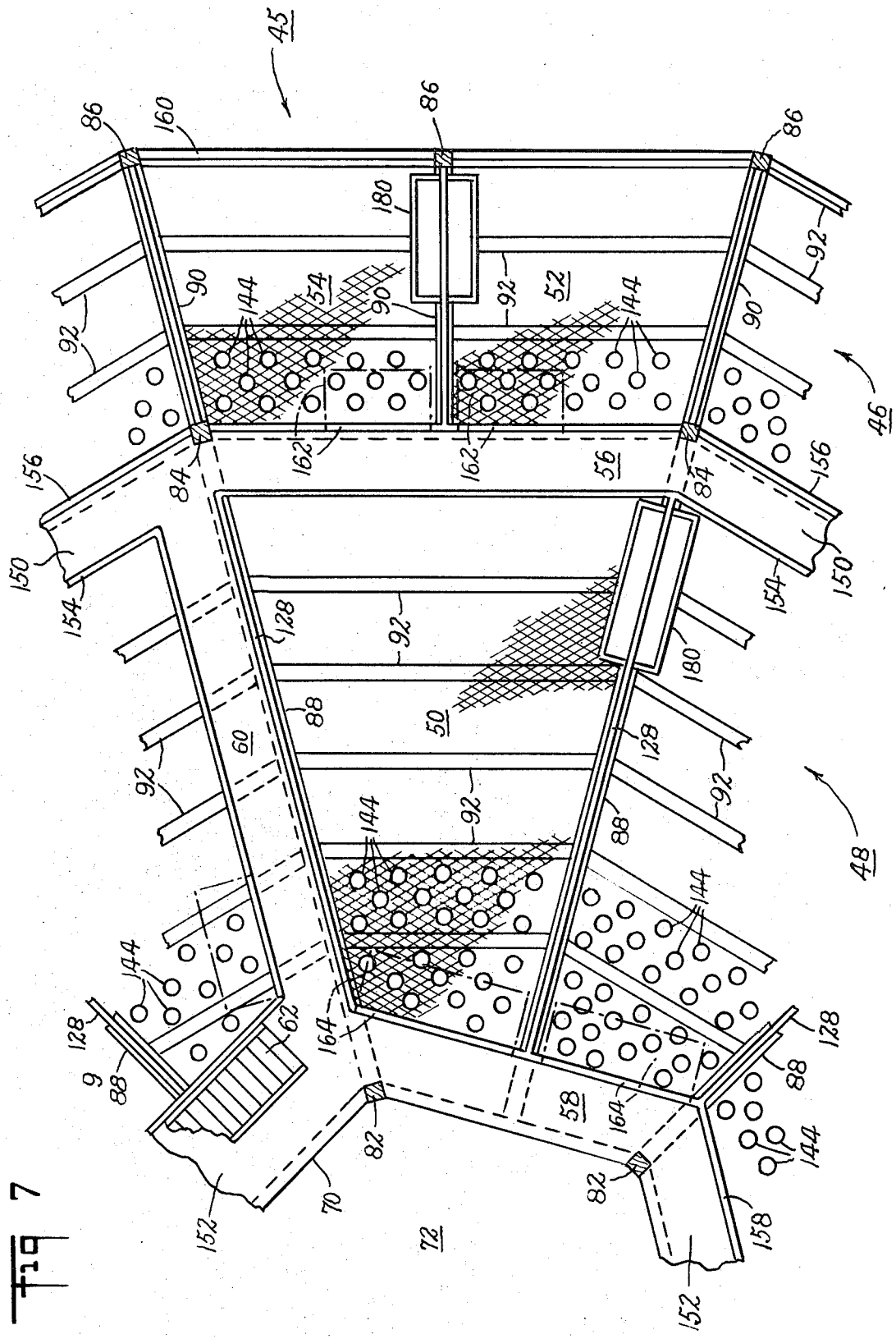

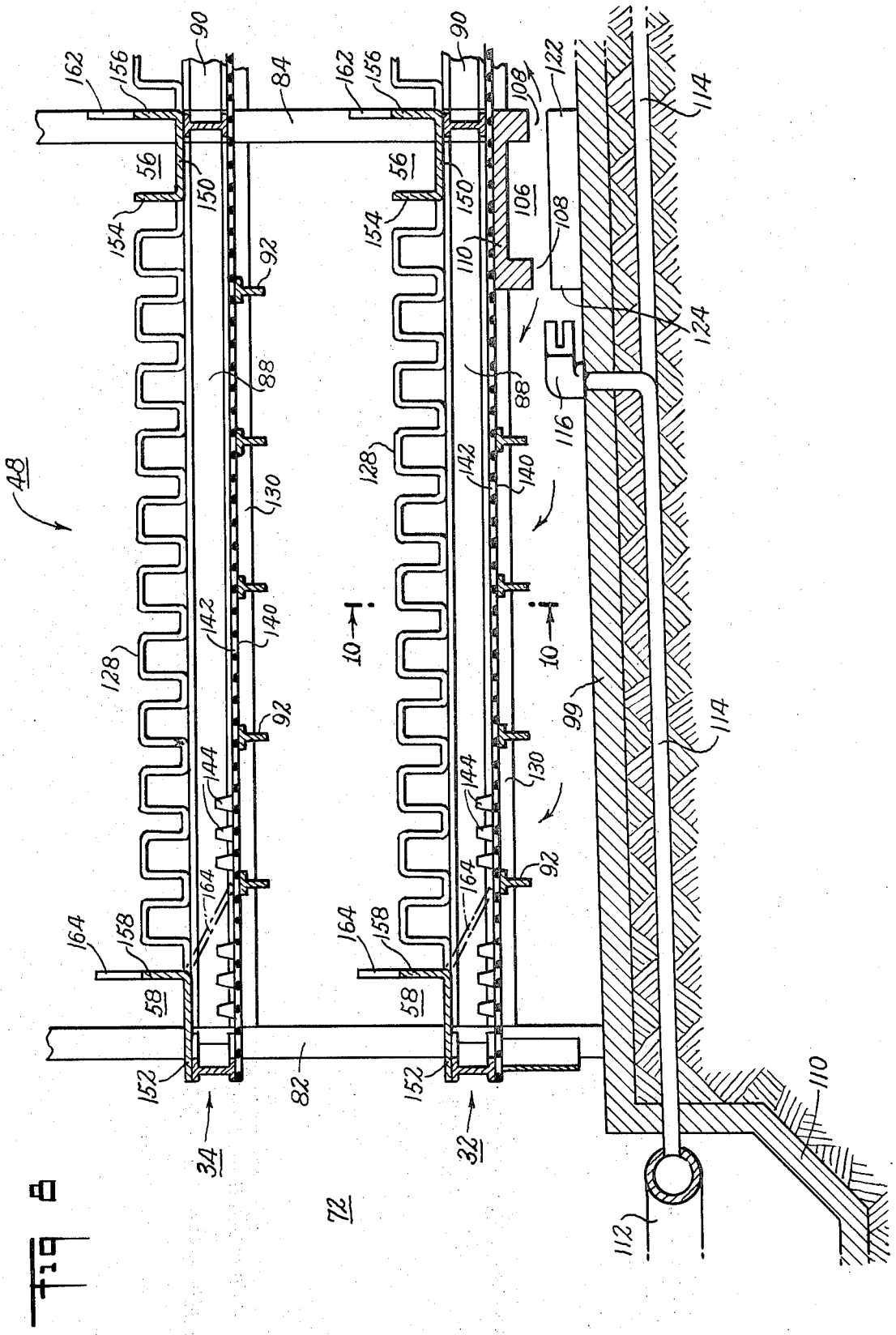

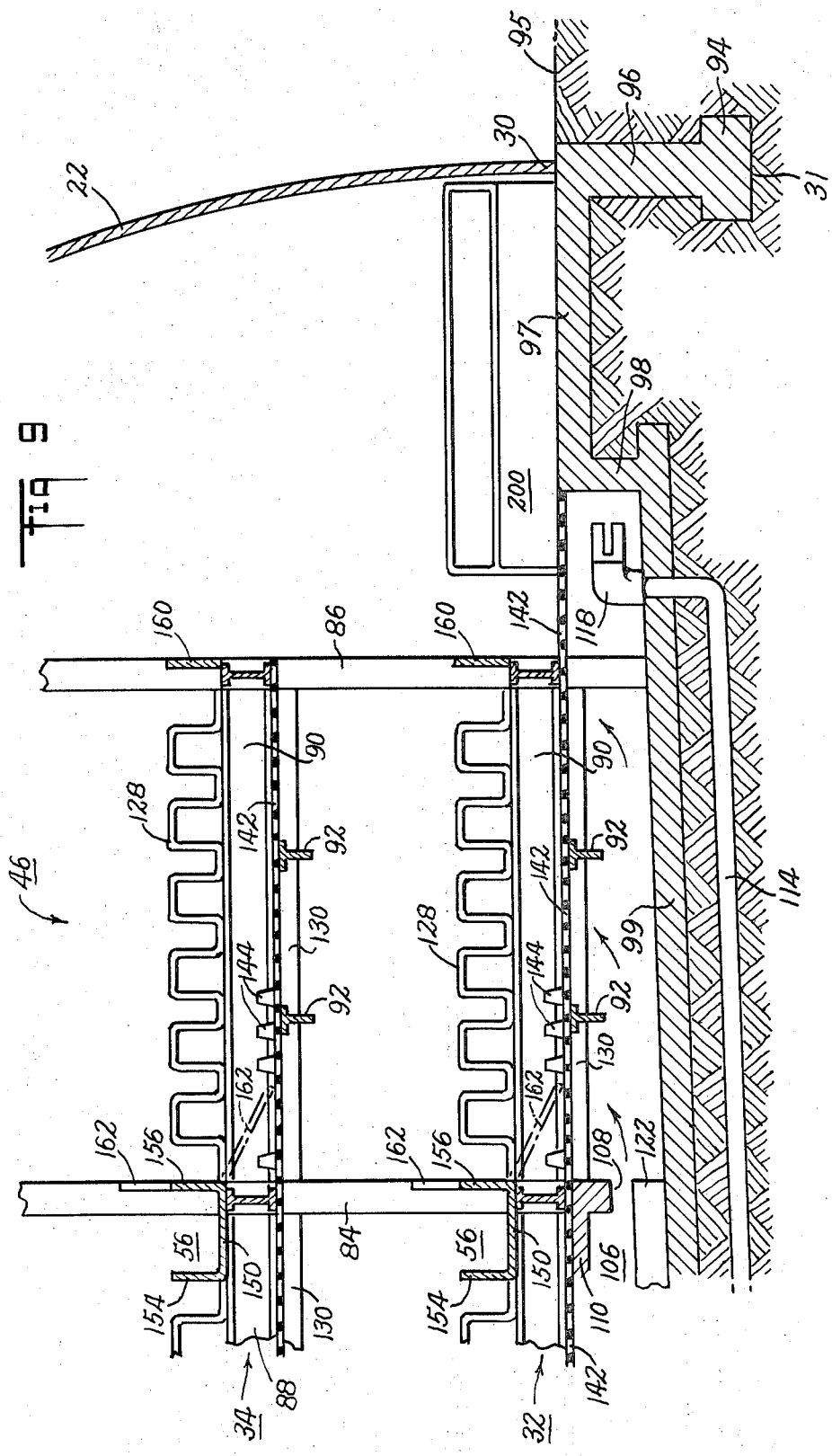

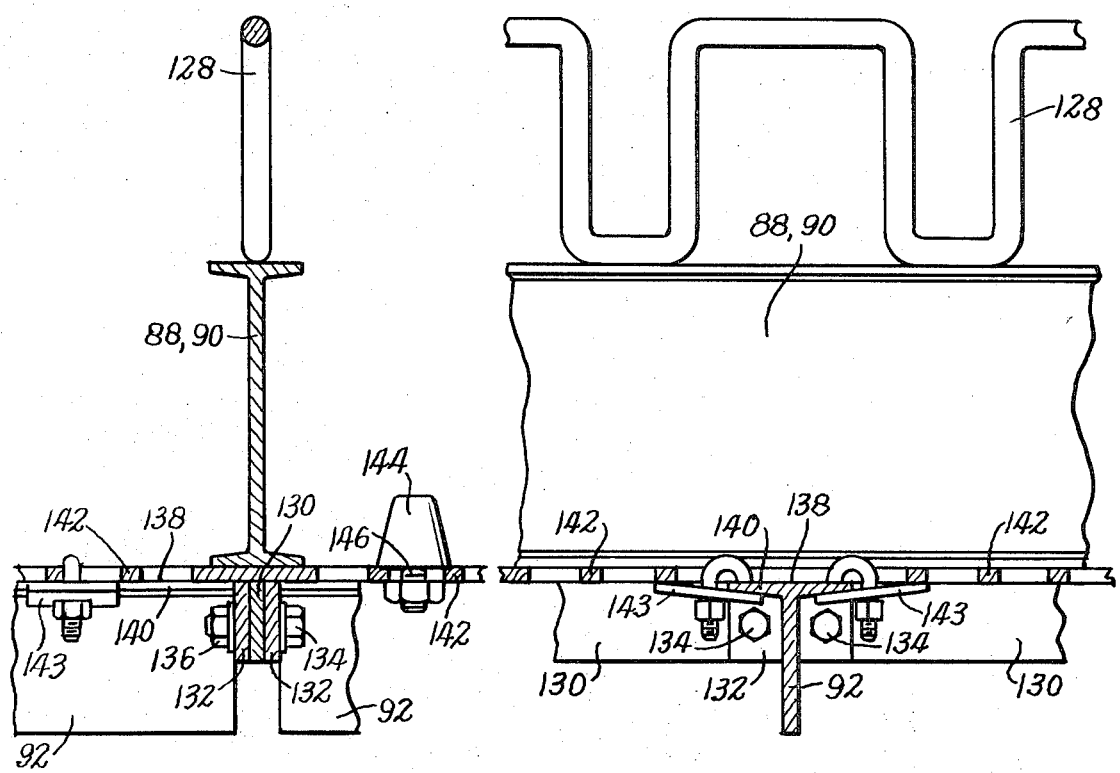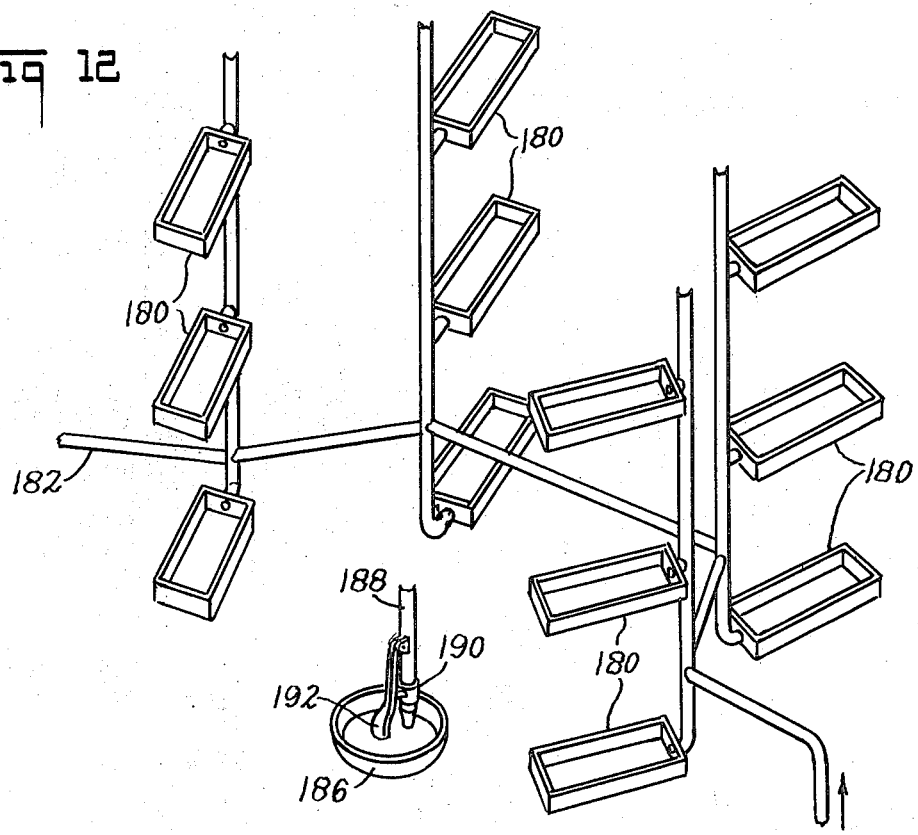

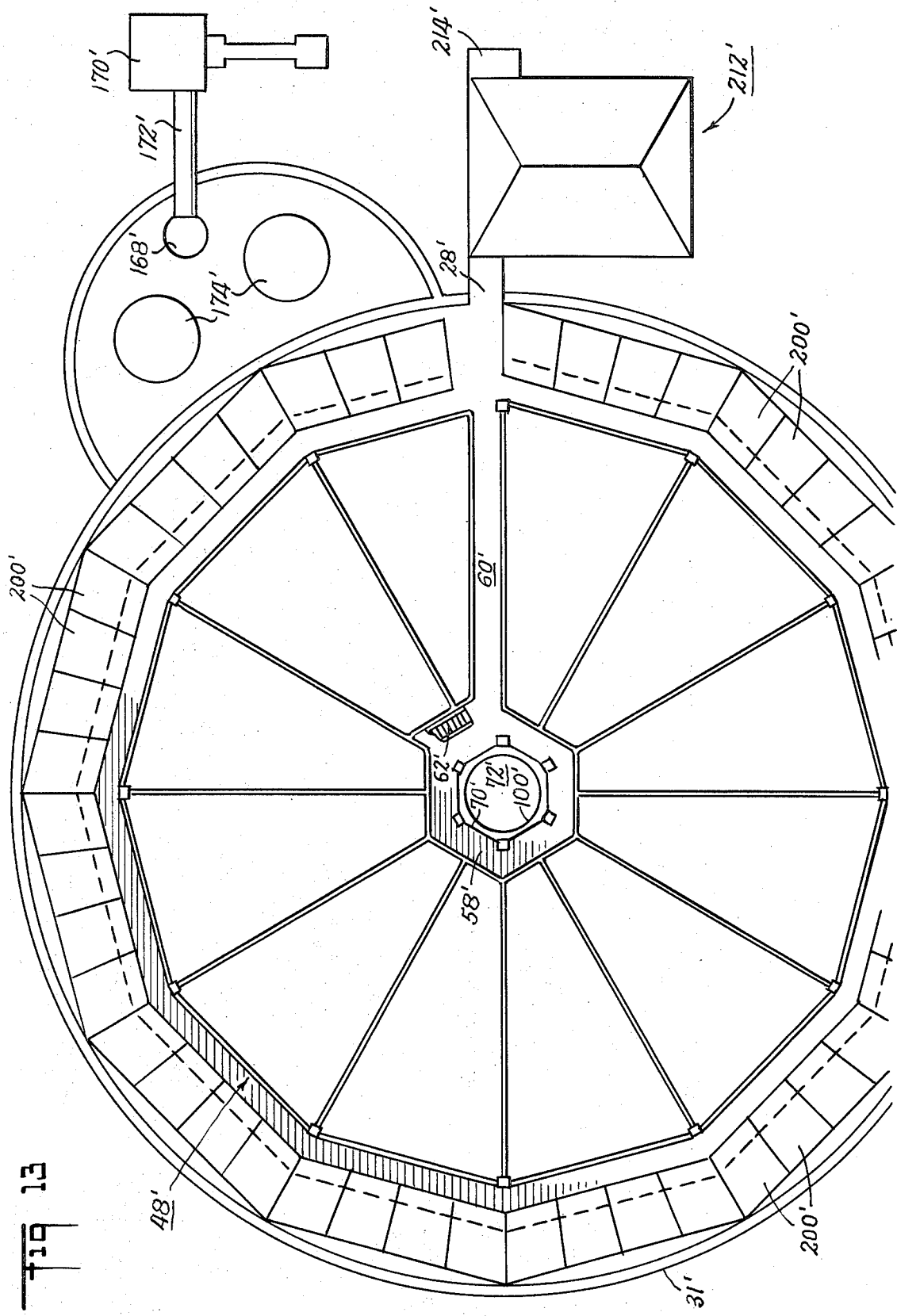

3,802,390

SYSTEM FOR FEEDING AND MAINTAINING ANIMALS IN A CONFINED ENVIRONMENT

This application is a continuation-in-part of copending application Ser. No. 879,194 filed Nov. 24, 1969, now Patent No. 3,633,547.

This invention relates to a system for maintaining and feeding animals in a confined environment and more particularly to a unique building structure combined with an automatic food distribution and waste recovery system to provide a fully automated confined housing and feeding system for animals.

Today, the problem of feeding a continuously increasing population, made more difficult by the concurrent shifting of population densities from rural agricultural areas to urban centers, has accentuated the necessity for increasing the productivity of those still engaged in farming and the raising of livestock for human consumption. Because of this two-fold requirement, i.e. producing ever increasing quantities of food and livestock for consumption by a rapidly increasing population and increasing the productivity of individual farmers to offset the decrease in the number of individuals engaged in farming, it has become critically necessary to develop farming procedures and techniques to increase productivity in order to meet the increasing demands. While great strides have been made in increasing productivity of farming operations so that the yield per acre of farm land under cultivation has steadily risen throughout the years, no equivalent gain in productivity has been obtained in the raising of livestock such as cattle, sheep and swine for human consumption.

Prior to the development described in the aforesaid patent, the raising of livestock such as cattle, sheep and swine for human consumption has been carried on mainly by grazing the animals in open fields until they are of a suitable weight to be sent to market or, in the case of cattle and swine, raising the swine in somewhat more confined quarters in pens accessible to a food supply for the swine. In any event, productivity has not been particularly high because overall systems management for the raising of livestock, particularly swine, has been poor, animal confinement structures have suffered from poor ventilation and problems in disposing of animal waste in a sanitary and efficient manner which all result in inordinately high costs.

Confined animal housing systems have been proposed heretofore, but such systems have not found wide acceptance because they have not provided a marked increase in productivity while lessening the direct manual labor involved in housing and caring for the animals.

Accordingly, it is an object of the present invention to provide a new and improved system capable of breeding and finishing great numbers of animals in a confined environment with a high degree of productivity and efficiency of operation.

It is a further object of the present invention to provide a new and improved system to maintain and feed a large number of animals within a confined enclosure by providing a building structure utilizing a unique pen design, pen locations and incorporating automatic equipment to feed and dispose of the animal waste and to automatically ventilate and maintain the internal atmosphere of the building for pig comfort.

It is yet another object of the present invention to provide a new and improved confined animal maintaining and feeding system which requires minimum direct labor to operate thus resulting in a high level of productivity and efficiency.

Still another object of the present invention is to provide a new and improved confined animal feeding system utilizing a liquid feed for the animals which is readily and automatically pumped to animal feed troughs to provide the animals with all their necessary food.

Yet another object of the present invention is to provide for a new and improved automatic animal feeding system wherein the manure waste produced from the animals is automatically collected and processed to form a culture which is then added as a protein supplement to the liquid feed which is in turn pumped to the food troughs.

Still another object of the present invention is to provide a system for pollution control by removing animal wastes quickly from the animal pens, aerating the manure thus removed to eliminate objectionable odorous gases, and processing the manure for use as a food supplement rather than sewage.

Still another object of the present invention is to provide a ventilation system for confined animal maintaining structure wherein the temperature and humidity of the air within the structure is automatically controlled for maximum animal comfort to compensate for seasonal variations of the temperature outside of the structure.

Still another object of the present invention is to provide a new and improved confined animal feeding and maintaining system which may be prefabricated into modular components prior to installation and assembled readily and easily at a desired site and which may then be readily knocked down and reassembled at a new location.

These and other aspects and advantages of the present invention will become more readily apparent after consideration of the following specification in conjunction with the accompanying drawings. It is to be expressly understood that while the present specification will be described wherein the structure of the present invention is used for feeding and maintaining swine, the structure is also adaptable for other livestock raised for human consumption, such as cattle and sheep.

In the drawings:

FIG. 7 is a view similar to FIG. 6 showing an enlarged segment of the pen structure typical of the upper tiers;

FIG. 8 is an elevational view taken on line 8—8 of FIG. 6;

FIG. 9 is a continuation of the elevational view taken on line 9—9 of FIG. 6;

FIG. 10 is an enlarged fragmentary section taken on line 10—10 of FIG. 8 showing particular details of construction;

FIG. 11 is a side view of FIG. 10;

FIG. 12 is a fragmentary diagrammatic representation showing the food trough and feed distribution system; and FIG. 13 is a plan view showing the first tier of an alternate embodiment for the structure of the present invention.

Figure 1:
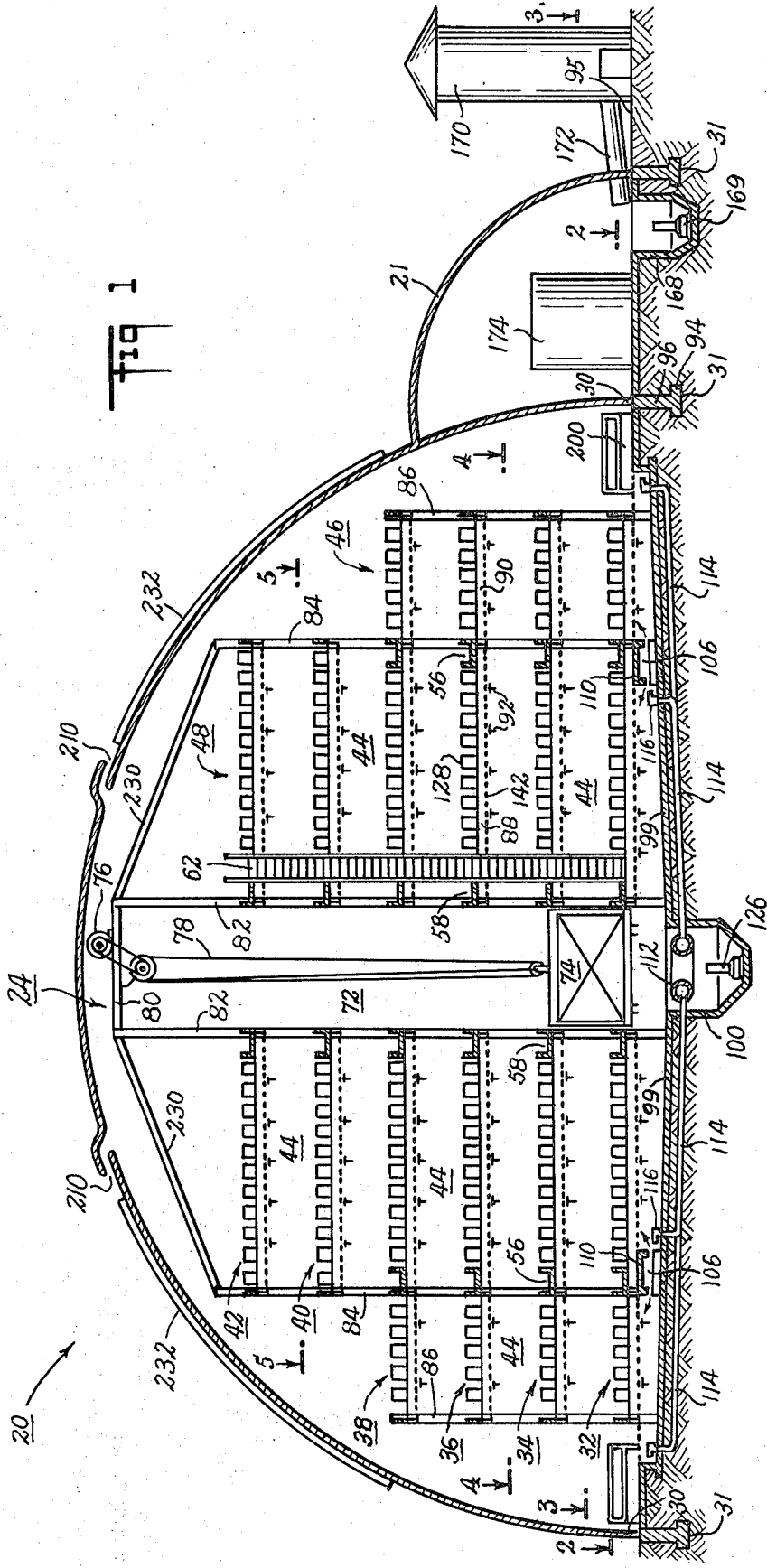
FIG. 1 is a diagrammatic elevational view of one embodiment of the structure of the present invention.

With reference now to the drawings and particularly FIG. 1, there is shown a building structure 20 comprising a flexible hemi-spherically shaped membrane forming a dome 22 which encloses a multi-tiered animal housing and confinement structure 24 within. A smaller companion dome 21' attached to dome 22 encloses a processing facility, as will be explained more fully hereinbelow. Dome 22 is preferably of a translucent material to allow light to pass therethrough and is adapted to be supported above the inner structure 24 by maintaining a slight degree of air pressurization within. An entrance passage 28 is provided (see FIG. 3) in dome 22 and the lower periphery 30 of dome 22 is suitably sealed to a circular foundation wall 31 embedded in the ground so that a slight positive pressure may be maintained within the building structure sufficient to support the flexible membrane of dome 22. Preferably, the animal confinement structure 24 is provided with six tiers or levels 32 through 42 with each tier having 12 major sides in plan and with two upper tiers 40 and 42 having an area appreciably less than the four lower tiers 32 through 38 in order to provide an internal silhouette which more closely approximates the internal contour of the domed enclosure 22.

Each tier 32 to 42 of structure 24 is partitioned into a number of individual animal confinement pens 44 which are provided with automatic food supply means and provision for automatic animal waste disposal systems as will be described more fully hereinbelow.

As shown in FIG. 1 as well as in FIGS. 3, 4 and 5, the four lower tiers 32, 34, 36 and 38 include an outer ring of pens 46 and an inner ring of pens 48, which pens are substantially identical for each tier except for minor structural modifications explained more fully hereinafter. The upper tiers 40 and 42 include only an inner ring of pens 48 and these pens are substantially the same as the inner ring of pens 48 in the four lower tiers.

Each of the animal pens 44 are constructed in modular fashion so that each pen or part thereof may be preassembled, for example, on a production line at a remote location, and then shipped to the site where the confined animal housing unit 20 is to be assembled into the completed structure 24.

Figure 3:
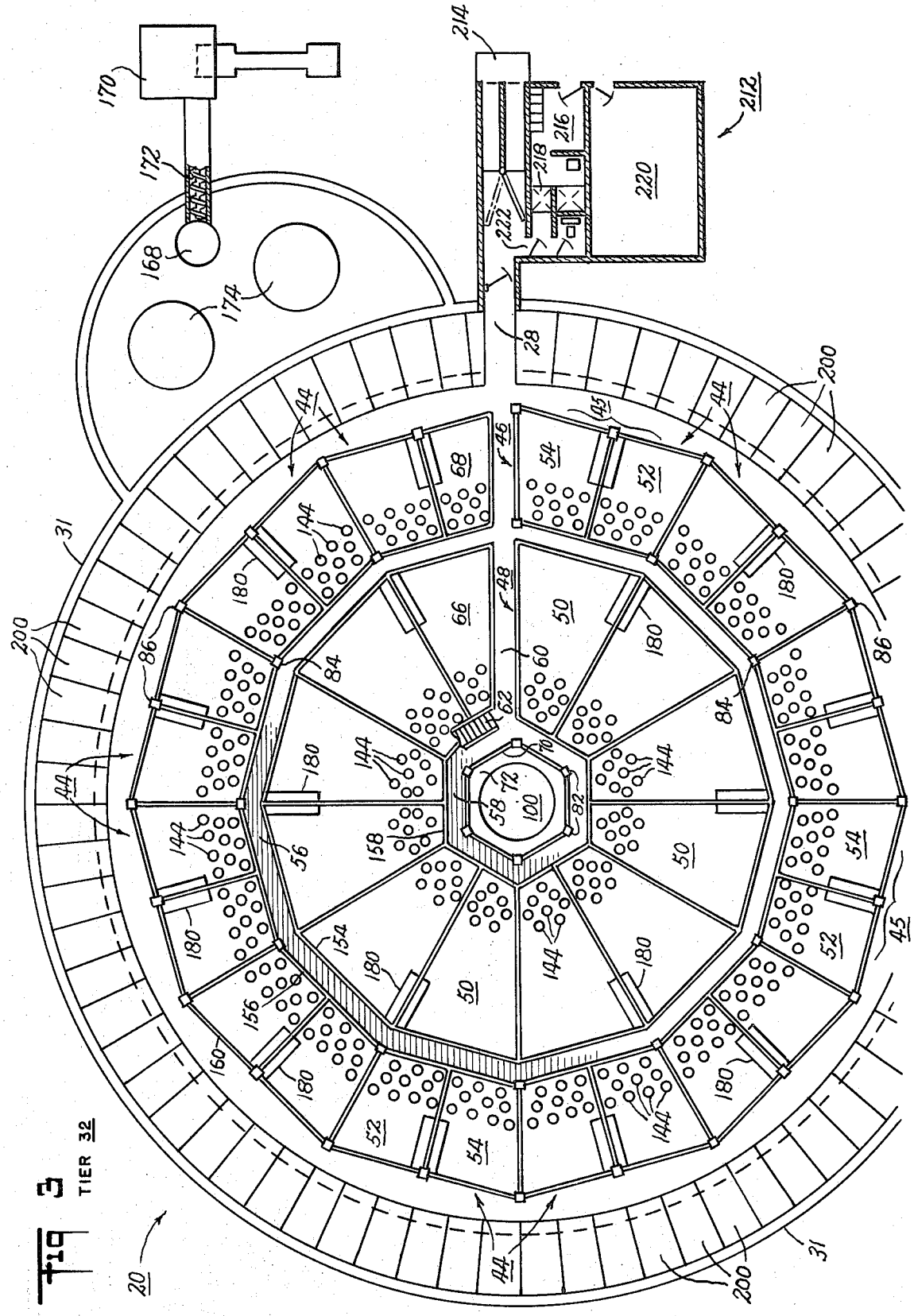
FIG. 3 is a horizontal section taken along the line 3—3 of FIG. 1 showing the first tier of the building structure of the present invention.
Figure 4:
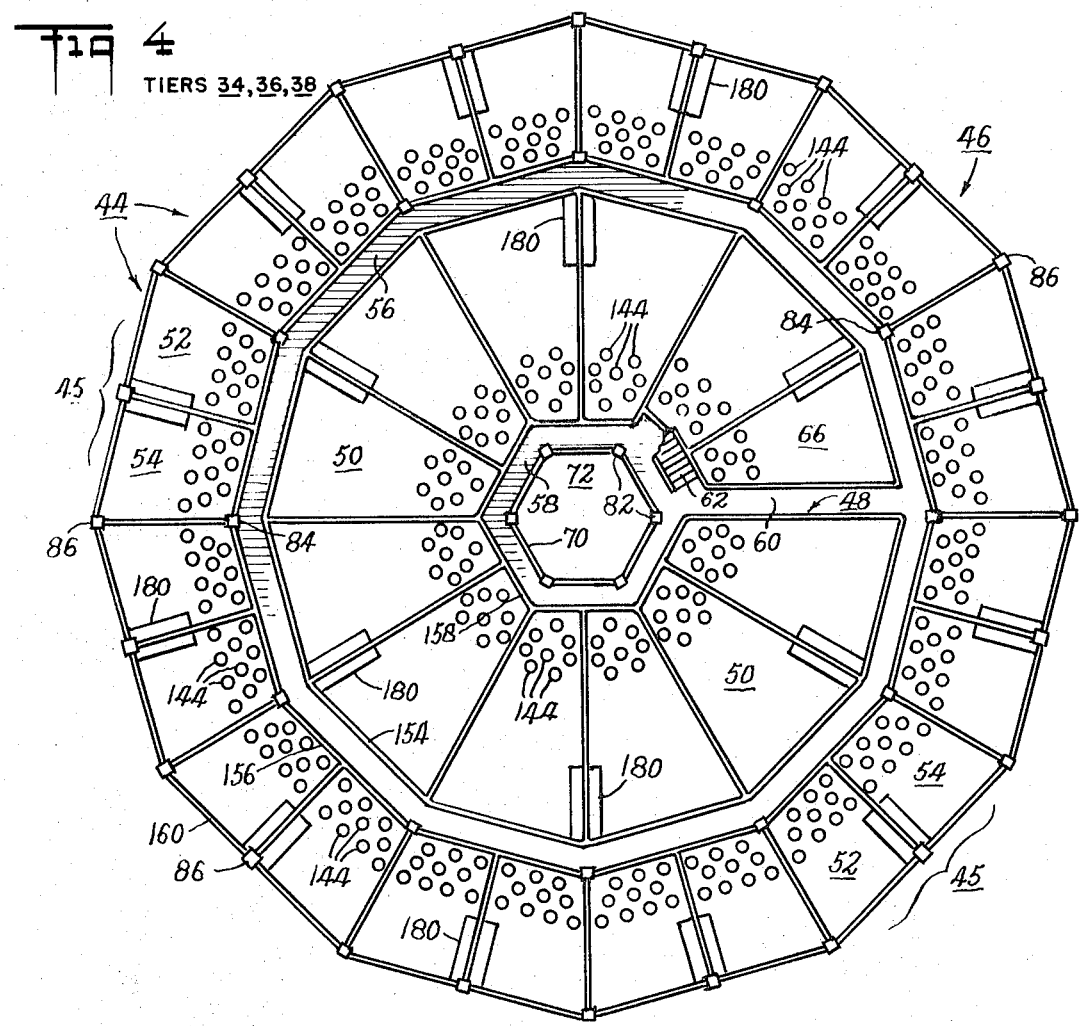
FIG. 4 is a horizontal section taken along the line 4—4 of FIG. 1 showing a typical floor plan for the second, third and fourth tiers of the building structure.

As best shown in FIG. 3, which is a diagrammatic plan view of the first tier 32, the modular pens 44 are arranged circumferentially as truncated pie-shaped wedges 45 which are trapezoidal in shape. The pens 50 within the inner ring 48 of animal confinement pens form a single pen at the apex of a pie-shaped wedge 45 and a double pen enclosure 52 and 54 is provided in the outer ring of pens 46 in the wider segment of the pie-shaped wedge 45. The inner ring 48 and outer ring 46 are spaced to provide a walkway 56 between and similarly, a walkway 58 is provided within the inner ring of pens 48. A walkway 60 is provided extending inwardly from entrance passage 28 to walkway 56 and to the inner walkway 58.

A vertically disposed stair 62 is provided within inner walkway 58 to facilitate access to the upper tier from lowermost tier 32 and an access space 64 is provided in the platforms of the innermost walkway 58 in each of the upper tiers 34-42.

Inner walkway 58 terminates in a perimeter 70 defining an opening 72 therein and an elevator platform 74 is provided closely approximating the opening 72 within walkway 58 to afford means to transmit animals from the first level tier 32 to each of the higher level tiers 34 through 42. The elevator platform 74 is driven by a motor 76 (see FIG. 1) driving a pulley system 78 and is supported on overhead structural members 80 above the uppermost tier 42 carried by standing vertical beam members 82 disposed adjacent the opening 72 through the tiers.

Tiers 34, 36 and 38 (see FIG. 4) have a layout similar to tier 32 in that the peripheral ring of pens 46 include dual pens 52 and 54 along the outer edge of a pie-shaped wedge 45, a central walkway 56, an inner walkway 58, an inner ring of pens 48 as well as a partial walkway 60 from the inner walkway 58 to outer walkway 56. Walkway 60 need only be a partial walkway as there is no need to provide a permanent access to the outer perimeter of ring 46.

Figure 5:
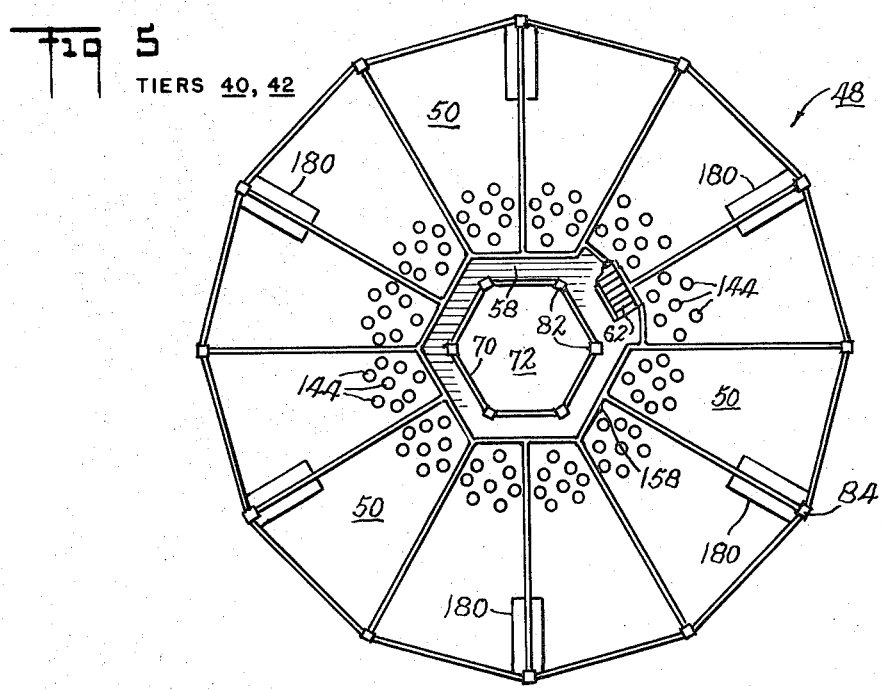
FIG. 5 is a horizontal section taken along the line 5—5 of FIG. 1 showing a typical floor plan for the fifth and sixth tiers of the building structure.

With reference now to FIG. 5, which is a diagrammatic plan of the upper tiers 40 and 42, it is noted that the position and orientation of the individual confinement pens in these tiers are substantially the same as the pens in the inner ring of pens 48 in tiers 34, 36 and 38 including the opening 72 of the elevator platform 74 into inner walkway 58. The major difference in tiers 40 and 42 is that walkway 60 is eliminated on these tiers since access to the individual pens may be made from the inner walkway 58 thus no radiating walkway is needed.

Reference is again made to FIGS. 3 and 4 where it is seen that all the pens 50 in inner ring 48 are the same size except the pen 66 adjacent walkway 60 and, in like manner, all the pens 52 and 54 in outer ring 46 are the same size except the pen 68 adjacent walkway 60. It is also noted, see FIG. 5, that the pens 50 in the upper single ring tiers are somewhat larger because there is no outer walkway so that the pen area is increased by the area taken up by walkway 56 in the lower tiers.

Reference is made again to FIG. 3 wherein the manner in which the individual modular pens 44 comprising the outer ring 46 and inner ring 48 in each of the tiers are supported one above the other is shown in order to complete the structure 24. As seen in FIG. 1, the modular pen units comprising the individual pens are stacked one above the other and are supported by spaced inner upstanding support members 82, radially outwardly spaced intermediate support members 84 and outermost spaced support members 86, see FIG. 3 as well where the positions of the vertical upstanding support members are shown. The outermost ring of vertical support members 86 extend up to tier 38 while the two inner rings 82 and 84 extend up to the uppermost tier with supports 84 being somewhat shorter than supports 82 to provide a structure to conform to the dome 22.

Horizontally disposed radial support beams 88, which are preferably I-beams, are provided at each tier radiating outwardly from upstanding support members 82 to upstanding support members 84 and similar I-beam members 90 are provided extending radially outwardly from members 84 to members 86. Radially spaced rings of interconnecting cross-beam members 92 are provided to interconnect the radially disposed support members in a manner described more fully hereinbelow.

Figure 2:
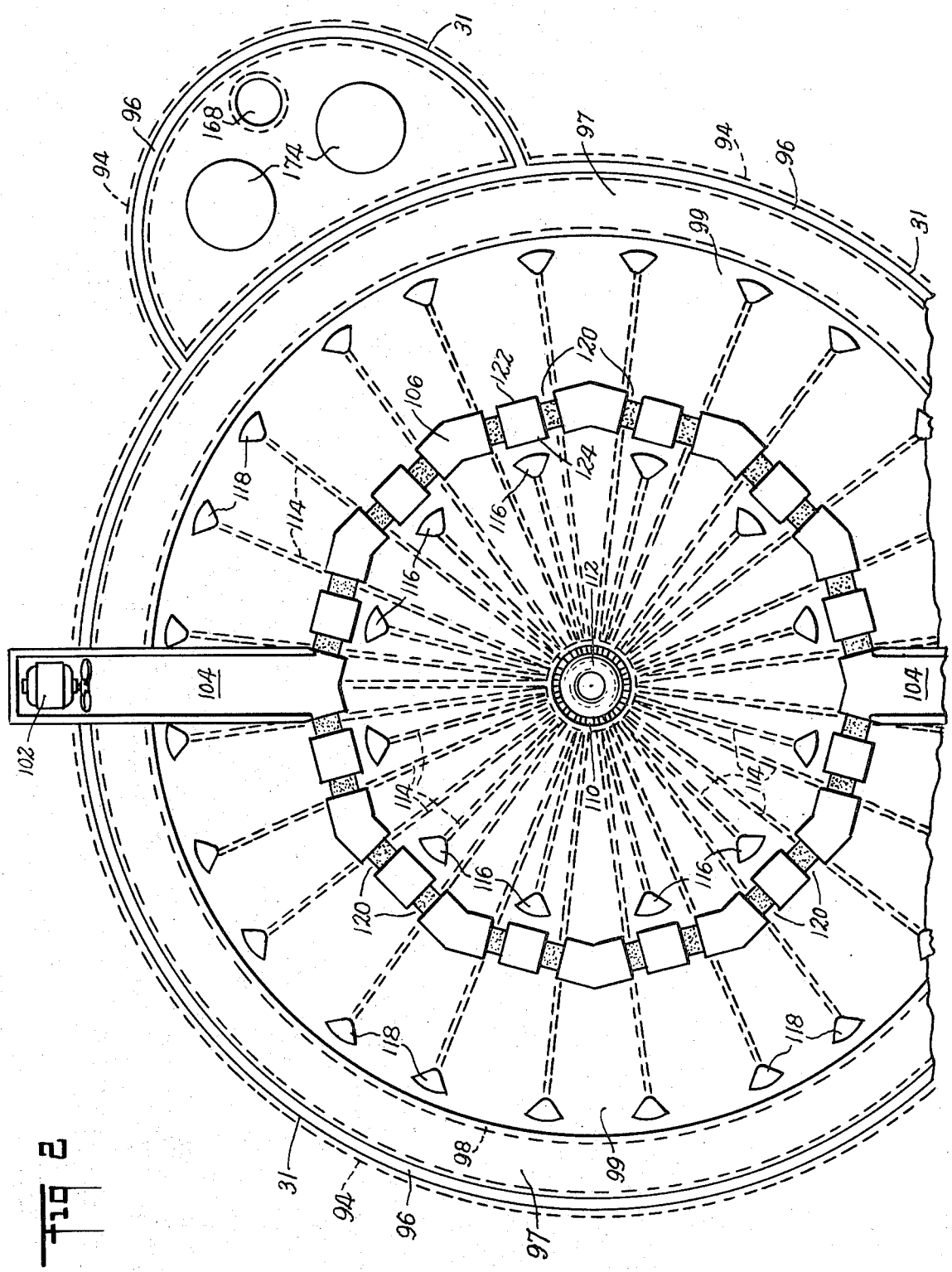
FIG. 2 is a horizontal section taken on line 2—2 of FIG. 1 showing the subterranean foundation of the structure of the present invention.

Before proceeding with a more detailed description of the animal confinement pens, it may be well to refer to FIGS. 1 and 2 for a description of the foundation for structure 20. The foundation includes a circular concrete footing 94 extending below the ground surface 95 and which forms a circular upper wall segment 96 to which the flexible membrane 22 is fixed. An elevated platform 97 extends radially inwardly from wall segment 96 to provide an annular platform about the interior of the structure adjacent the membrane 22. Platform 97 terminates in a circular vertical wall segment 98 which extends upwardly from the circular foundation floor 99 of the structure.

The foundation floor is uniformly sloped radially inwardly toward the center of the structure where the central waste collection vat 100 is provided below the surface of foundation floor 99.

Air under slight pressurization to support the flexible membrane 22 is supplied to the interior of the structure by diammetrically opposed blowers 102 disposed outside the building structure which force air through diammetrically opposed air delivery ducts 104 beneath foundation floor 99 which ducts direct the air to a polyhedron shaped air delivery duct 106. Duct 106 is provided with openings 108 through the sides to allow air to flow into the interior of the structure. A deflecting baffle 110 is provided mounted beneath tier 32 which is elevated above foundation floor 99 so that air from openings 108 will be diverted as indicated by the arrows in FIG. 8. Thus, air forced by blowers 102 flows through the duct distribution system to within the structure and is deflected by baffle 110 to provide a diverging air stream for complete circulation through the structure.

The flooring members in each of the modular confinement pens 44 are of an open mesh grill work to allow light and ventilation air to pass freely therethrough and also to allow the animal waste products to fall through the flooring members for collection. Accordingly, waste collection means are provided to collect waste products which accumulate on the surface of floor 99. Hence, provision is made to provide for a flushing system to flush the surface of foundation floor 99 to flush accumulated waste matter into collection vat 100.

To this end, an annular flush fluid distribution means 112 is provided within vat 100 which receives flush fluid under pressure from pump 126 in vat 100. Radiating outwardly from means 112 are a plurality of radially disposed distribution lines 114, see FIG. 8 as well where at least two lines are shown for each pen segment, which terminate in a plurality of radiating orifices above the surface of floor 99. An inner ring of orifices 116 and an outer ring of orifices 118 are provided to flush waste from the inner and outer rings of pens, respectively. Flush fluid under pressure is thus directed through distribution lines 114 to orifices 116 which direct a spray flush fluid to flow over the surface of foundation floor 99. Because the floor is inclined toward collection vat 100, the waste matter carried by the flush fluid flows into the vat 100 where a portion of the flush fluid is diverted for further processing while the remainder is recycled for flushing waste matter from floor 99.

The outer ring of orifices 118 are directed outwardly to have their spray impinge upon vertical wall segment 98 and disburse the flush fluid to cause it to flow uniformly over the surface of floor 99 to insure that all of the waste products are flushed away. The flush fluid thus flows radially inwardly and is directed over a plurality of radially disposed spaced channels 120 through air duct opening 106. To insure that flush fluid and waste does not flow into the air duct spaced sections of wall sections or curbs 122 are provided, see FIG. 8 as well, on the outer periphery of duct 106 with the spacing between adjacent curbs 122 coinciding with the presence of a channel 120 therebetween. Thus, flush fluid and waste are directed to the spacing between curb sections 122 and pass through air duct 106 on the channels 120.

Along the radially inward perimeter of air duct 106 a plurality of spaced upstanding wall sections or curbs 124 are provided to form a backdrop to have the spray of flush fluid from outwardly directed orifices 116 impinge thereon to uniformly distribute the spray of flush fluid from orifices 116 to effectuate a uniform flushing of the inner portion of the surface of foundation floor 99. In this manner, both the outer and inner segments of foundation floor 99 are effectively flushed and the collected waste matter is collected in vat 100. From vat 100 the collected waste material is pumped by pump 126 to companion dome 21 for further processing as will be explained more fully hereinbelow.

Figure 6:
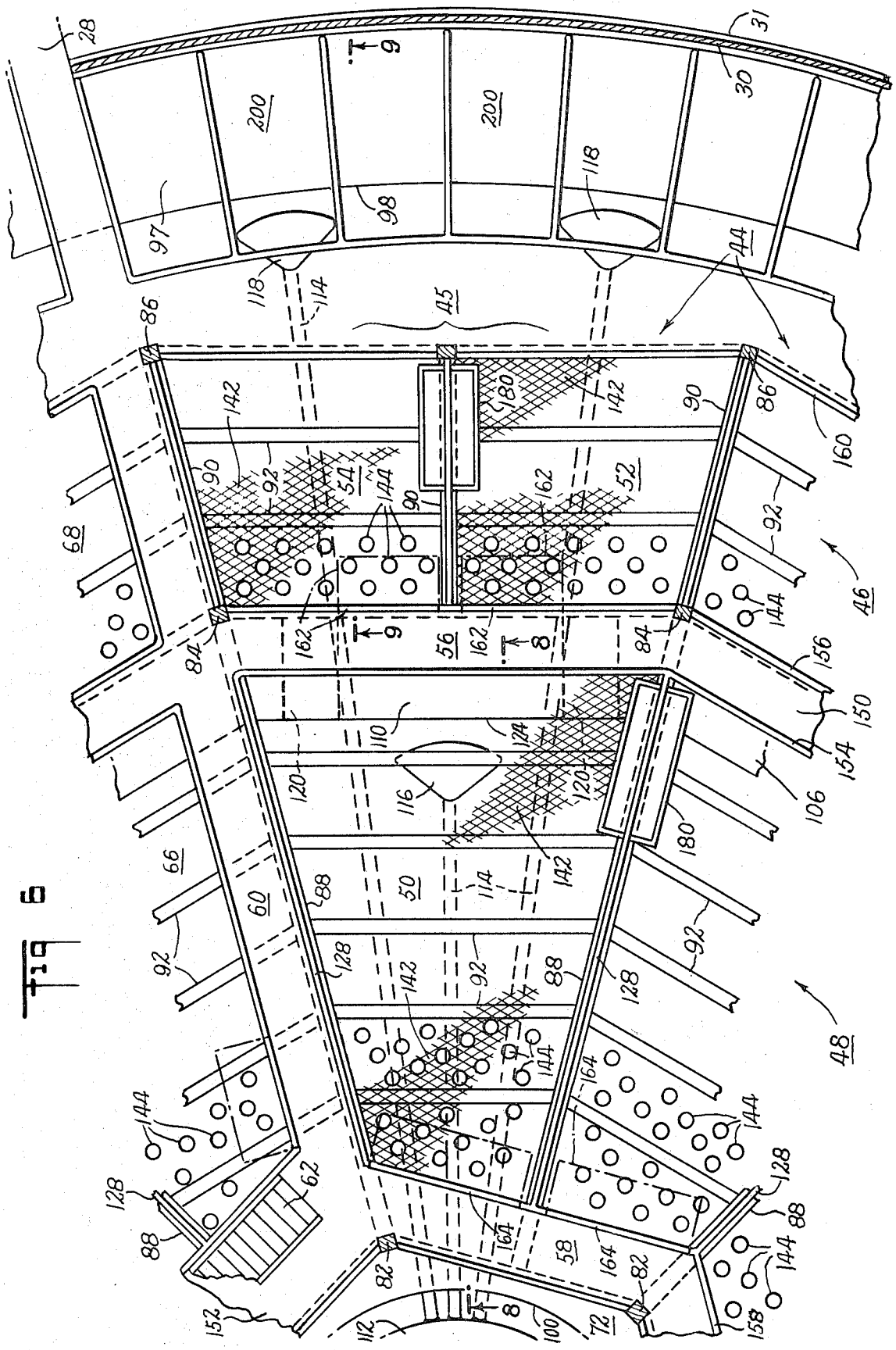
FIG. 6 is a plan view of an enlarged segment of the pen structure of the first tier.

Reference is now made to FIGS. 6–11 for details of construction of the modular confinement pens 44. FIG. 6 shows a plan view, on a somewhat enlarged scale, of a pie-shaped wedge 45 on the first tier 32 of structure 24. As seen in FIG. 6, the vertical support members 82, 84 and 86 extend vertically through the flooring for the pens. In tier 32 the flooring is supported at an elevation above inclined foundation floor 99. With particular reference to FIGS. 10 and 11, which is typical of the construction of modular pens 44, it is seen that the radiating I-beam support members 88 and 90 extend above the level of the pen flooring and thus define a portion of the side walls of each pen. To increase the height of the side walls separating adjacent pens a partition member 128 preferably in the form of bent reinforcing bsrs, is mounted on the upper flange of the I-beam. In this manner, sufficient height is provided to prevent animals from moving between pens.

A plurality of spaced depending flange plates 130 are affixed in any suitable manner to the underside of the lower flange of I-beams 88 and 90. The individual cross beam segments 92, which are preferably T-beams have a connecting plate 132 fixed to each end, for example by welding, and the connecting plates 132 are fixed to the depending flange plates by suitable throughbolts 134 and nuts 136 and the upper surface 138 of the flange 140 of the radially spaced T-beam cross brace segments 92 provide a support surface of the pen flooring member.

The pen flooring is a grated flooring 142 of an open mesh grill work and is preferably a sheet of expanded metal. For each modular pen 44 the flooring 142 can be fabricated from a number of sheets of expanded metal cut to conform to the particular trapezoidal shape of the particular pen in which it is to be installed. Thus, the flooring 142 permits light and circulating air to pass freely therethrough yet the grating is of a sufficiently small size so that animals within the pens may be comfortably supported thereon. In addition, the grated flooring allows the animals' waste products to fall through the flooring for collection on foundation floor 99 as described above. Suitable radially disposed stiffeners 143 comprising short segments of steel or sheet metal slats may be affixed to the underside of flooring member 142 between radially spaced cross beam members 92 as well.

At this point it may be well to digress from a description of the structure itself to observe that swine, in particular, possess certain inherent characteristics which makes utilization of the structure of the present invention particularly beneficial. Contrary to popular misconception, swine are fundamentally relatively clean and intelligent animals and their reputation as being dirty animals, because they are continually wallowing in mud, is not indicative of their true characteristics. Swine wallow in mud because they have no sweat glands and desire to wet their skins to bring about evaporative cooling. Because swine are inherently clean and intelligent animals, they have a built in compulsion for the most part to resist defecating and urinating in those areas where they sleep. Hence, if a hog or pig sleeps in one portion of a pen, it will go to another portion of the pen in order to urinate or defecate. Accordingly, the present invention provides an area of the pen conducive to defecating and urinating and a comfort area of the pen conducive to sleeping and eating where the animals spend the preponderance of their time. Thus, the food supply for the swine is provided in the comfort area of the pens and the area for elimination of animal waste is designated at the innermost area of the pens.

The innermost segments of each pen are provided with a plurality of spaced upwardly projecting obstacles 144 which preferably are frusto-conical in shape. These obstacles may be formed of concrete or other suitable material and are provided with an extending member 146, such as a bolt imbedded in the concrete, which is affixed to the flooring member 142 in any suitable manner. These obstacles are strategically spaced in the innermost portion of each pen 44 so that an animal such as a pig may readily walk through the area but which present an uncomfortable surface should the pig attempt to lie down to sleep or rest. The obstacles thus provide a means to make the inner portion of the pen not conducive to pigs reclining in this area. Thus, the pigs avoid this area of the pen except for the necessity to urinate and defecate. Once a pattern has been established the odor associated with this area of the pen attracts the pigs when they have an urge to relieve themselves and a strong ingrained pattern to urinate and defecate only in the desired zone results. As noted previously, the waste matter falls through the flooring assisted by the tramping action of the pigs' feet to be collected in vat 100.

As best seen in FIG. 8, walkways 56 and 58 comprise a floor plate member 150 and 152, respectively, supported on the upper flange of I-beams 88 so that the walkways are elevated above the level of the pen flooring 142. Side plates 154 and 156 extend upwardly from each side of walkway floor plate 150 to provide, respectively, a barrier at the outward end of the inner ring of pens 48 and at the inner end of the outer ring of pens 46. In like manner, a vertically extending plate 158 is provided outside walkway 58 to provide a barrier for the inner end of the inner ring of pens 48. A suitable barrier plate 160 is also provided at the outer end of the pens in outer ring 46 and the outer ends of the pens in tiers 40 and 42. The various barrier plates serve to confine the animals in the individual pens.

Segments of barrier plates 156 and 158 are made to pivot downward to afford access to the pens from walkways 56 and 58 and to provide a ramp for pigs to enter and leave a pen. Accordingly, at each pen, barrier 156 includes segments 162 which pivot from a vertical position to an inclined position, as shown in broken line in FIGS. 6 and 8. Thus, when barrier segment 162 is pivoted to the downwardly inclined position a ramp is formed to allow access to the pens in outer ring 46 from walkways 56. In like manner, barrier segments 164 of barrier 158 are provided to afford access to inner ring of pens 48 from walkway 58 around the elevator platform opening 72.

As noted previously, the animal waste products and flush fluid collected in vat 100 are pumped to processing apparatus within dome 21 where the waste products are converted into a protein supplement in processing vats 174 which is utilized in the animals feed. This process is more particularly described in the aforesaid patent and in copending application Ser. No. 100,587, filed Dec. 22, 1970, copending application Ser. No. 170,974, filed Aug. 11, 1971 and copending application Ser. No. 203,249, filed Nov. 30, 1971, which applications are incorporated herein by reference. Inasmuch as the referred to patent and copending applications describe the conversion process in greater detail no further exposition will be made herein. For purposes of the present invention, it is sufficient to note that the animal waste products after conversion to a protein supplement are mixed with dry feed such as corn and bean meal obtained from storage silo 170. The dry feed is transferred by a suitable auger conveyor 172 to feed tank 168 where the protein supplement and water are added to form a slurry feed.

The liquid slurry feed is pumped by a pump 169 in feed tank 168 through a manifold distribution system to feed troughs within each modular pen 44. With reference to FIGS. 6, 7 and 12, a plurality of feed troughs 180 are provided to be accessible to animals within pens 44 in the outer portion of the pen away from the area where the obstacles 144 are provided. Each trough 180 is common to a pair of adjacent pens and is radially oriented so that animals in pairs of adjacent pens feed from the same trough 180.

A feed distribution network 182 is provided communicating with the central source of supply and suitable control valves and a control system are provided to insure that a predetermined quantity of feed at predetermined feeding intervals is automatically distributed to each feed trough 180. The quantity of feed supplied and the feeding intervals are determined for the number and size of the pigs confined in the pens so that substantially all of the feed supplied is consumed before a new supply of feed is added to the feed troughs.

While a great proportion of the pigs' need for water is accounted for in the slurry feed it is desirable to supply an independent source of water should the pigs desire water between feedings. Thus, each pen is provided with a demand use water system, see FIG. 12, which includes a water retention cup 186 fed by a water line 188 from a central source of supply. A control valve 190 in line 188 is responsive to a pivoting link member 192 positioned above cup 186. Pigs learn readily to push their noses against link member 192 and inward movement of link 192 opens control valve 190 to let water into the cup 186. Thus, drinking water is made available to each modular confinement pen 44.

As best seen in FIGS. 1 and 9, annular platform 97 adjacent membrane 22 has provision to accommodate a plurality of farrowing pens 200 which may be utilized when sows are ready to farrow their litters. Utilization of the farrowing pens which are of standard construction within the structure 20 provides a confined animal system which accommodates pigs from the time they are farrowed until fattened sufficiently for slaughter. Provision may also be made to use a portion of the area on platform 97 for breeding as well.

One of the air blowers 102 is of the type which have forwardly inclined blades to provide sufficient air moving capacity so as to preclude the necessity of an air lock at entrance passage 28. The air as noted previously is distributed through ducts 104 to air delivery duct 106 and upwardly into the structure through air duct openings 108. The air is deflected by baffle 110, as will be explained hereinbelow, so that air is circulated up through the inner ring of pens and the outer ring of pens in each tier and is exhausted from the top of membrane 22 through exhaust canopys 210. The air is filtered before introduction to the structure and may be preconditioned, if necessary, so that insects, dust and foreign matter is precluded from entering the structure. The air pressure is sufficiently high so that when air passage 28 is opened the rush of air out of the passage prevents foreign matter from entering the structure.

To insure antiseptic conditions within the structure a "white room" structure 212 is provided outside structure 20. White room 212 includes an access ramp 214 for the operator which diverts the operator to an office complex 216 where the operator can change into a white coat and clean boots. The complex 216 includes a foot bath facility 218 for the operator to wash off his boots before entering the structure, convenience facilities such as shower, toilet, wash basin and an office 220. Entry from white room complex 212 to the structure is through a passage 222 after foot bath facility 218. Pig access to the structure is upon ramp 224 which bypasses the white room facility.

Another aspect of the present invention is the provision of a total environment, fully automated and controlled animal maintenance system. Thus, along with the automated waste removal and processing, the conversion of the waste to a food supplement and the automated distribution of food to the separate animal feeding troughs, a total controlled environment and purification system for the air within enclosure 22 is also provided. Accordingly, the air supply to the building structure, which is slightly pressurized in order to support flexible dome 22, is carefully controlled in order to provide the swine within the enclosure with an optimum environment for all seasons.

Thus, it may be desirable to provide an ultraviolet air purification system to purify the air entering the structure, a selectively operable dehumidifier to remove moisture from the air when such a condition is desirable, for example, in cold weather passing of air through a dehumidifier would tend to raise the temperature of the air passing therethrough as the heat of vaporization of the water removed from the air would be imparted to the air. It may also be desirable to provide means to cool or heat the air within the delivery ducts 104 where the structure is to be erected in areas of extreme temperature conditions.

As a back up to the air pressurization system for flexible dome 22 and to prevent complete collapse of the dome in the event that the dome is ripped and pressure cannot be maintained to support the dome, stringers 230 are provided interconnecting the upper ends of vertical support members 82 and 84 (see FIG. 1). Thus, vertical support member 82 is made slightly longer than vertical support member 84 so that stringer 230 connecting the two is inclined at an angle approximating the internal contour of dome 22. Thus, should flexible dome 22 collapse for any reason, the stringers would provide sufficient internal support to prevent the dome covering from collapsing completely.

Environmental control of the temperature and humidity of the air within the enclosure 22 may be made to be responsive to temperature and humidity sensors (not shown) placed at numerous strategic locations within the enclosure. These sensors are connected to a central control panel (not shown) with various control devices. It is evident that the heaters and/or air conditioning units may be made to be responsive to the sensed temperature of the air within enclosure 22. However, depending upon the severity of the weather conditions where structure 20 is erected, sufficient control may be obtained without requiring auxiliary conditioning units.

The structure described herein has a capacity of about 5,000 swine and, since, the normal surface body temperature of swine is over 100°F., the animals themselves generate considerable heat. Hence, the heat generated by the animals in conjunction with the warming effect created by auxiliary heating elements, for example propane heaters, or by dehumidifying the air may provide sufficient heat to warm the internal temperature of the structure to a comfortable level in winter.

The primary cooling effect in the structure is obtained through the heat sink afforded by the expanded metal floor which removes heat from the animal's bodies and by the flow of ventilation air through the floors which produces a convection effect to remove heat and humidity. In addition, the slurry feed provides water to the animals with their dry feed to give the animals a water balance which assists in maintaining the animals cool.

Additionally, to cool the animals in summer, and also to provide a method to cleanse the animals and pens, an internal sprinkling system is provided which also acts as a fire sprinkling system. For this purpose, a water supply network comprising water lines (not shown) rising vertically from a source of water under pressure at each tier level directed into the pens in inner ring 48 and outer ring 46. Thus, when the nozzles are opened in response to a temperature and/or humidity sensor, or because of high heat due to a fire, a water spray is emitted which has a cooling effect and which also cleanses the animals and the pens. In addition, the spray may be activated periodically to wash the animals and the pens to cleanse the pens and insure that all waste matter is flushed down to foundation floor 99.

Additional cooling is obtained by providing a series of water spray lines 232 (see FIG. 1) outside the dome structure 22. Lines 232 are disposed to radiate outwardly from the top of dome 22 and are adapted to emit a very fine spray or mist to wet down the exterior of flexible member 22. Because the spray is a fine mist, it evaporates rapidly causing a cooling effect immediately adjacent the exterior skin surface of membrane 22 and this cooling of the surface of member 22 also provides a cooling effect to the air within the enclosure. This cooling also assist to cool the animals within as the cool panel of membrane 22 draws the body heat of the animals within the structure. Because of the hemispherically shaped dome, the cooler air flows downwardly along, and close to, the exterior skin of the membrane to also cool the lower portion of the dome 22 and provide some cooler air for the intake of blowers 102.

Returning to a discussion of the ventilation system it is seen that the first tier forms a plenum chamber defined by baffle 110, the floor of tier 32 and foundation floor 99. As air is forced out of the ducts 106 into the plenum chamber, a uniform pressure builds up within this plenum chamber and then rises uniformly through the open mesh grill work of all the tiers and out the vents at the top of the dome. In this manner, a uniform flow of ventilation air through each tier of the structure is provided.

Reference is now made to FIG. 13, showing an alternate embodiment of a structure constructed with only a single ring of pens 48'. Reference characters for elements which are similar to those previously described with respect to the embodiment of FIG. 1 are indicated with a prime notation. This embodiment may be constructed where a more limited animal capacity is desired so that a capacity of 2,000 swine can be provided with a single ring of pens in a four-tier structure.

While specific features of construction have been described heretofore it is readily apparent that alternative constructions may be employed without departing from the scope of the invention. Illustrative of some of these changes are an alternative construction for walkways 56 and 58 where the walkways are placed at the same level as the flooring of the confinement pens 44. In such a construction the barrier segments may be made to pivot inwardly like a gate or segments may be made removable to afford ingress and egress from the pens.

Also, additional companion domes or blisters may be provided to house farrowing and breeding pens instead of placing the farrowing pens around the structure. It may also be found desirable to add an additional companion dome or blister which could be utilized for animal slaughtering im order to provide a complete animal system to care for, feed and maintain animals and slaughter them for market in one structure.

It may also be desirable in certain constructions to utilize a rectangular shaped structure so that the multi-tiered structure will be rectangular shaped in plan instead of circular as specifically described herein.

From the foregoing, it is evident that the present invention provides a fully automated, climatically controlled animal maintaining and feeding system with the capacity to house large numbers of animals within a confined area to greatly increase productivity in the raising of livestock for human consumption. Direct manual labor requirements are minimized as the present invention provides for ready care for up to 5,000 animals in a confined enclosure. The animals' food is processed and delivered automatically, the feed is in the form of a liquid slurry which not only supplies all of the necessary nutritive elements but also a significant portion of the water requirements for the animals. Additionally, a fully automatic animal waste removal system is provided in conjunction with a water processing system to convert animal waste into a high protein food supplement which is added to a corn and/or bean meal slurry. This provides a further cost reduction for feed costs as well as providing a sanitary system for disposal of animal waste.

The structure provides for a comfort area and an animal waste elimination area in each pen by providing means to induce the animals to remain in the comfort area except when the urge to eliminate waste occurs. Once a pattern is established, the odor of waste products from the waste elimination area will tend to reinforce and ingrain in the animals the propensity to eliminate waste only in the desired areas.

The slurry feed as noted above, supplies a significant portion of the animals' water requirements and the availability of additional drinking water provides an adjustment for differing biological needs of the animals and eliminates the need to provide for increased water volume in the slurry feed system when temperature changes produce a high water demand for the animals.

A central elevator system provides a simple means to transport animals from tier to tier and affords access to confinement pens on each tier and also affords a ready view of all of the pens to simplify observance and management of the animals within the structure. In practice, the younger animals would be placed in pens on the upper tier first and as they grew in size would be systematically shifted to pens on a lower tier. When shifted to a lower tier, the animals would first be placed in pens in the outer ring 46, as these pens are smaller in size than the pens in inner ring 48, and when they ahve grown in size the animals would be shifted to pens in inner ring 48 where they would remain until they reach market weight. The pens in inner ring 48 are also most accessible to the elevator and/or central walkway 58 and, hence, the large bulky animals ready for market would not be made to walk great distances in order to be readily removed. In addition, a vehicle may also be provided through walkway 60 in the first tier to facilitate movement of the large bulky animals to and from the central elevator.

While a preferred embodiment of the present invention has been specifically described herein, it is to be noted that various modifications can be made thereto without departing from the spirit and scope of the invention as defined in the appended claims.

What is claimed is:

1. A system for maintaining and feeding animals in a confined environment comprising:
   a multi-tiered animal housing structure,
   each said tier in said structure comprising a plurality of modular animal confinement pens arranged circumferentially about a central area and contiguous to each other,
   said modular confinement pens including a flooring of an oepn mesh grill work along the whole extent of each pen, each open mesh grill work being sufficiently small to support an animal comfortably thereon while still allowing free passage of light and circulation air therethrough,
   each said pen further including means other than bodily constraining means to induce animals confined therein to utilize a predetermined area of said pen predominately for the elimination of the animal's waste products whereby the animal waste products fall through said open mesh grill work of the flooring to a solid foundation floor beneath the first tier of said structure, and means to remove animal waste products from said foundation floor and to collect said waste products.

2. A system as defined in claim 1 wherein said means to induce animals to utilize a predetermined area of said pen predominately for the elimination of the animal's waste comprises a plurality of spaced obstacles protruding from the surface of said flooring in said predetermined area to provide a surface to preclude animals from utilizing said predetermined area in a reclining rest position whereby said animals develop a tendency to utilize said predetermined area predominately for eliminating waste products.

3. A system as defined in claim 2 wherein said foundation floor is inclined uniformly radially inwardly toward a centrally located waste collection vat below the level of said foundation floor and said means to remove and animal waste products accumulating on said foundation floor comprises a plurality of circumferentially disposed spray nozzles communicating with a source of recycling flush fluid under pressure to direct flush fluid to the surface of said foundation floor whereby said flush fluid carries accumulated animal waste products along said inclined surface of said foundation floor to said collection vat.

4. A system as defined in claim 3 wherein said plurality of spray nozzles are oriented to direct a flush spray radially outwardly, said foundation floor including wall segments extending upwardly from the floor surface disposed radially outwardly of said spray nozzzles, said spray nozzles being adapted to direct spray flush fluid to impinge upon said wall segments thereby to disburse said spray flush fluid uniformly over the surface of said inclined foundation floor to effectively flush all the area of said foundation floor.

5. A system as defined in claim 1 including means to provide a supply of feed to animals confined in each said pen comprising a plurality of radially oriented feed troughs for each said tier, each said trough communicating with a source of slurry feed under pressure through a distribution network of feed supply lines extending from each said trough to said source of slurry feed, said troughs adapted to be filled with a predetermined volume of feed at predetermined intervals.

6. A system as defined in claim 5 wherein said radially oriented feed troughs are disposed about each said tier to provide one feed trough for pairs of adjacent confinement pens whereby a single feed trough is positioned along a common barrier between said adjacent confinement pens.

7. A system as defined in claim 6 including means accessible within each confinement pen to provide a source of drinking water on demand for the animals confined therein.

8. A system for maintaining and feeding animals in a confined environment comprising:
a multi-tiered animal housing structure,
each said tier in said structure comprising a plurality of modular animal confinement pens arranged circumferentially about a central area and contiguous to each other,
means within said central area to afford access to said modular confinement pens immediately adjacent thereto,
said modular confinement pen including a flooring of an open mesh grill work along the whole extent of each pen, said open mesh grill work being sufficiently small to support an animal comfortably thereon while still allowing free passage of light and ventilation air therethrough,
said structure including a plurality of spaced upstanding support members disposed in a plurality of concentric rings about said central area,
each said tier including horizontal support members having an upper surface and a lower surface disposed radially outwardly between radially in-line pairs of said upstanding support members to provide the principal support members for each said tiers, and
said flooring in each said pen being supported below the lower surface of said horizontal support members whereby said radially extending support members serve to define opposed side wall members for said confinement pens.

9. A system as defined in claim 8 wherein said means to afford access to said modular confinement pens comprises an annular walkway about said central area, said walkway being elevated above said flooring and supported by said horizontal support members, said walkway including an upstanding barrier about a perimeter thereof with said barrier defining an end wall member for each said confinement pen.

10. A system as defined in claim 9 wherein said barrier includes a segment therein adjacent each pen pivotable from a first vertical position precluding access from said walkway to the adjacent pen to a second downwardly inclined position to afford a ramp into said adjacent pen whereby animals can be placed into and removed from said pen.

11. A system as defined in claim 9 wherein a plurality of the lowermost tiers of said multi-tiered structure include an inner ring of modular confinement pens and an outer ring of modular confinement pens spaced radially outwardly from said inner ring and each said plurality of lower tiers including an intermediate circumferential access walkway between said inner ring and outer ring of modular confinement pens to permit access to said outer ring of confinement pens,
said intermediate access walkway being elevated above said flooring and supported by said horizontal support members and including opposed upstanding barriers adjacent each side of said intermediate walkway with the radially innermost of said barriers defining an end wall member for each said confinement pen in said inner ring and the radially outermost of said barriers defining an end wall member for each said confinement pen in said outer ring.

12. A system as defined in claim 8 including a flexible dome-shaped membrane to completely enclose said multitiered structure, said dome-shaped structure adapted to be supported by air pressurization from within and means operatively associated with said structure to provide a supply of air under pressure within said membrane sufficient to support said dome-shaped membrane.

13. A system as defined in claim 12 wherein said means to provide a supply of air includes an air supply duct having at least one outlet exterior of said membrane, blower means in said duct to draw air from without said structure, said supply duct communicating with an annular air delivery duct disposed below the first tier of said multi-tiered structure, air exit ports spaced about said air delivery duct to permit air flow from said delivery duct to said multi-tiered structure enclosed within said membrane and at least one air outlet port in said membrane at an elevation above the uppermost tier of said multi-tiered structure whereby an air circulation path is provided for ventilation air upwardly through the open mesh grill work of the floor members in each said confinement pen on each tier.

14. A system as defined in claim 12 including means responsive to temperature and humidity sensors within said membrane to cool the air circulating within said membrane comprising a plurality of water supply lines operably connected to a source of water under pressure disposed within said structure having a plurality of spray nozzles operatively associated therewith, said nozzles being adapted to open to emit a water spray to each said modular confinement pen responsive to said temperature and humidity sensors thereby to cool the air circulating within said membrane as well as cleansing said structure and animals confined therein.

15. A system as defined in claim 12 wherein said dome-shaped membrane when erected and supported by air pressure from within is hemi-spherically shaped, a plurality of radiating water supply lines operatively connected to a source of water under pressure fixed to the exterior surface of said membrane, said water lines being adapted to emit a fine mist spray responsive to temperature conditions sensed within said membrane, whereby said fine spray mist evaporates rapidly thereby causing a cooling effect on the ambient air immediately adjacent the exterior of said membrane and cause a cooling effect which cools the air circulating within said membrane, said cooling effect also resulting in a flow of cool air downwardly from the apex of said membrane to the ground along the exterior surface thereof.

16. A system for maintaining and feeding animals in a confined environment comprising:
 a multi-tiered animal housing structure,
 each said tier in said structure comprising a plurality of animal confinement pens;
 said modular confinement pens including a flooring of an open mesh grill work, each open mesh grill work being sufficiently small to support an animal comfortably thereon while still allowing free passage of light and circulation air therethrough,
 each said pen further including means other than bodily constraining means to induce animals confined therein to utilize a predetermined area of said pen predominately for the elimination of the animal's waste products whereby the animal waste products fall through said open mesh to an area therebelow; and
 means to remove animal waste products from said area.

17. A system as defined in claim 16 wherein said means to induce animals to utilize a predetermined area of said pen predominately for the elimination of the animal's waste comprises a plurality of spaced obstacles protruding from the surface of said flooring in said predetermined area to provide a surface to discourage animals from utilizing said predetermined area in a reclining rest position whereby said animals develop a tendency to utilize said predetermined area predominately for eliminating waste products.

18. A system as defined in claim 16 wherein said area therebelow is inclined toward a waste collection vat and said means to remove animal waste products accumulating on said area therebelow comprises a means communicating with a source of fluid to direct the fluid to the surface of said area therebelow whereby said fluid carries accumulated animal waste products along said inclined surface to said collection vat.

19. A system as defined in claim 18 wherein said means communicating with a source of fluid comprises a plurality of orifices being adapted to direct fluid to impinge upon the wall segments of the pens thereby to disburse said fluid uniformly over the surface of said inclined area therebelow to effectively flush all the area of said area therebelow.

20. A system as defined in claim 16 including a flexible membrane to completely enclose said multi-tiered structure, said flexible membrane adapted to be supported by air pressurization from within and means operatively associated with said structure to provide a supply of air under pressure within said membrane sufficient to support said membrane.

21. A system as defined in claim 20 wherein said means to provide a supply of air includes an air supply duct having at least one outlet exterior of said membrane, blower means in said duct to draw air from without said structure, said supply duct communicating with an air delivery duct , air exit ports spaced about said air delivery duct to permit air flow from said delivery duct to said multi-tiered structure enclosed within said membrane and at least one air outlet port in said membrane at an elevation above the uppermost tier of said multi-tiered structure whereby an air circulation path is provided for ventilation air upwardly through the open mesh grill work of the floor members in each said confinement pen on each tier.

22. A system as defined in claim 20 wherein a plurality of fluid supply lines operatively connected to a source of fluid under pressure is fixed to the exterior surface of said membrane, said fluid lines being adapted to emit a fine mist spray responsive to temperature conditions sensed within said membrane, whereby said fine spray mist evaporates rapidly thereby causing a cooling effect on the ambient air immediately adjacent the exterior of said membrane and causes a cooling effect which cools the air circulating within said membrane, said cooling effect also resulting in a flow of cooling air downwardly from the apex of said membrane to the ground along the exterior surface thereof.

23. A system as defined in claim 16 including means to provide a supply of feed to animals confined in each said pen comprising a plurality of feed troughs for each said tier, said troughs communicating with a source of slurry feed through a distribution network of feed supply lines extending from each said trough to said source of slurry feed, said troughs adapted to be filled with a predetermined volume of feed at predetermined intervals.

24. A system as defined in claim 23 wherein said feed troughs are disposed about each said tier to provide one feed trough for pairs of adjacent confinement pens whereby a single feed trough is positioned along a common barrier between said adjacent confinement pens.

25. A system as defined in claim 16 including means accessible within each confinement pen to provide a source of drinking water on demand for the animals confined therein.

26. A system for maintaining and feeding animals in a confined environment comprising:
   a multi-tiered animal housing structure,
   each said tier in said structure comprising a plurality of animal confinement pens,
   said confinement pens including a flooring of an open mesh grill work, said open mesh grill work being sufficiently small to support an animal comfortably thereon while still allowing free passage of light and ventilation air therethrough,
   said structure including a plurality of spaced upstanding support members,
   each said tier including horizontal support members having an upper surface and a lower surface disposed between pairs of said upstanding support members to provide the principal support members for each said tier, and
   said flooring in each said pen being supported below the lower surface of said horizontal support members whereby said horizontal support members serve to define opposed side wall members for said confinement pens.

27. A system as defined in claim 26 wherein a walkway is provided among said confinement pens, forming a portion of a side thereof with said barrier also defining an end wall member of said confinement pen.

28. A system as defined in claim 27 wherein said barrier includes a segment therein adjacent each pen movable from a first vertical position precluding access from said walkway to the adjacent pen to a second downwardly inclined position to afford a ramp into said adjacent pen whereby animals can be placed into and removed from said pen.

* * * * *